(12) United States Patent
Wong et al.

(10) Patent No.: US 6,903,490 B2
(45) Date of Patent: Jun. 7, 2005

(54) LONGITUDINAL MODE OPTICAL LATCHING RELAY

(75) Inventors: Marvin Glenn Wong, Woodland Park, CO (US); Arthur Fong, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 172 days.

(21) Appl. No.: 10/413,251

(22) Filed: Apr. 14, 2003

(65) Prior Publication Data

US 2004/0201322 A1 Oct. 14, 2004

(51) Int. Cl.[7] .............................. H01L 41/08; G02B 6/26
(52) U.S. Cl. .................. 310/323.17; 310/328; 310/348; 385/9; 385/18; 385/147; 335/47; 335/49; 335/56
(58) Field of Search ................................ 310/328, 348, 310/323.17; 200/182, 211, 187–189, 212, 214; 385/9, 147, 18

(56) References Cited

U.S. PATENT DOCUMENTS

| | | | |
|---|---|---|---|
| 2,312,672 A | 3/1943 | Pollard, Jr. | 335/58 |
| 2,564,081 A | 8/1951 | Schilling | 335/56 |
| 3,430,020 A | 2/1969 | Von Tomkewitsch et al. | 200/181 |
| 3,529,268 A | 9/1970 | Rauterberg | 335/56 |
| 3,600,537 A | 8/1971 | Twyford | 200/407 |
| 3,639,165 A | 2/1972 | Rairden | 428/433 |
| 3,657,647 A | 4/1972 | Beusman et al. | 324/94 |
| 4,103,135 A | 7/1978 | Gomez et al. | 200/185 |
| 4,200,779 A | 4/1980 | Zakurdaev et al. | 200/187 |
| 4,238,748 A | 12/1980 | Goullin et al. | 335/56 |
| 4,245,886 A * | 1/1981 | Kolodzey et al. | 385/19 |
| 4,336,570 A | 6/1982 | Brower et al. | 362/4 |
| 4,419,650 A | 12/1983 | John | 337/119 |

(Continued)

FOREIGN PATENT DOCUMENTS

| | | |
|---|---|---|
| DE | 19751169 | 5/1999 |
| EP | 0593836 A1 | 4/1994 |
| FR | 2418539 | 9/1979 |
| FR | 2458138 | 12/1980 |
| FR | 2667396 | 4/1992 |
| JP | SHO 36-18575 | 10/1961 |
| JP | SHO 47-21645 | 10/1972 |
| JP | 57040206 | 3/1982 |
| JP | 62-276838 | 12/1987 |

(Continued)

OTHER PUBLICATIONS

TDB–ACC–NO: NB8406827, "Integral Power Resistors For Aluminum Substrate." IBM Technical Desclosure Bulletin, Jun. 1984, US, Vo27, Issue No. 1B, p. 827.

Bhedwar, Homi C., et al. "Ceramic Multilayer Package Fabrication." Electronic Materials Handbook, Nov. 1989, pp 460–469, vol. 1 Packaging, Section 4: Packages.

Kim, Joonwon, et al., "AMicromechanical Switch With Electrostatically Driven Liquid–Metal Droplet." Sensors and Actuators, A: Physical. v 9798, Apr. 1, 2002, 4 pages.

Jonathan Simon, "A Liquid–Filled Microrelay With A Moving Mercury Microdrop" (Sep. 1997), Journal of Microelectromechanical Systems, vol. 6, No. 3. pp. 208–216.

(Continued)

*Primary Examiner*—Thomas M. Dougherty

(57) ABSTRACT

A piezoelectric optical relay array having one or more array elements. Each array element contains a transparent mirror housing, located at the intersection of two optical paths. A liquid metal slug is moved within a channel passing through the transparent mirror housing by the action of piezoelectric elements. The liquid metal slug is moved in or out of the transparent mirror housing to select between the optical paths. When the liquid metal slug is within the transparent mirror housing, an incoming optical signal is reflected from a reflective surface of the slug. The liquid metal of the slug adheres to wettable metal surfaces within the channel to provide a latching mechanism.

20 Claims, 5 Drawing Sheets

U.S. PATENT DOCUMENTS

| | | | |
|---|---|---|---|
| 4,434,337 A | | 2/1984 | Becker ........................ 200/220 |
| 4,475,033 A | | 10/1984 | Willemsen et al. ...... 250/201.1 |
| 4,505,539 A | * | 3/1985 | Auracher et al. ............. 385/19 |
| 4,582,391 A | * | 4/1986 | Legrand ...................... 385/17 |
| 4,628,161 A | | 12/1986 | Thackrey ................. 200/61.47 |
| 4,652,710 A | | 3/1987 | Karnowsky et al. ......... 200/235 |
| 4,657,339 A | | 4/1987 | Fick ........................... 385/22 |
| 4,742,263 A | | 5/1988 | Harnden, Jr. et al. ....... 310/331 |
| 4,786,130 A | | 11/1988 | Georgiou et al. ............. 385/48 |
| 4,797,519 A | | 1/1989 | Elenbaas .................... 200/226 |
| 4,804,932 A | | 2/1989 | Akanuma et al. ............. 335/38 |
| 4,988,157 A | | 1/1991 | Jackel et al. .................. 385/17 |
| 5,278,012 A | | 1/1994 | Yamanaka et al. ............ 430/32 |
| 5,415,026 A | | 5/1995 | Ford ........................... 73/651 |
| 5,502,781 A | | 3/1996 | Li et al. ........................ 385/4 |
| 5,644,676 A | | 7/1997 | Blomberg et al. .......... 370/416 |
| 5,675,310 A | | 10/1997 | Wojnarowski et al. ...... 338/309 |
| 5,677,823 A | | 10/1997 | Smith ........................ 361/234 |
| 5,751,074 A | | 5/1998 | Prior et al. ................. 307/118 |
| 5,751,552 A | | 5/1998 | Scanlan et al. ............. 361/707 |
| 5,828,799 A | | 10/1998 | Donald ........................ 385/16 |
| 5,841,686 A | | 11/1998 | Chu et al. ..................... 365/51 |
| 5,849,623 A | | 12/1998 | Wojnarowski et al. ...... 438/382 |
| 5,874,770 A | | 2/1999 | Saia et al. ................... 257/536 |
| 5,875,531 A | | 3/1999 | Nellissen et al. .......... 29/25.35 |
| 5,886,407 A | | 3/1999 | Polese et al. ............... 257/706 |
| 5,889,325 A | | 3/1999 | Uchida et al. .............. 257/724 |
| 5,912,606 A | | 6/1999 | Nathanson et al. ........... 335/47 |
| 5,915,050 A | | 6/1999 | Russell et al. ................. 385/7 |
| 5,972,737 A | | 10/1999 | Polese et al. ............... 438/122 |
| 5,994,750 A | | 11/1999 | Yagi .......................... 257/415 |
| 6,021,048 A | | 2/2000 | Smith ........................ 361/736 |
| 6,180,873 B1 | | 1/2001 | Bitko ........................ 174/9 F |
| 6,201,682 B1 | | 3/2001 | Mooij et al. ............. 361/306.1 |
| 6,207,234 B1 | | 3/2001 | Jiang .......................... 427/333 |
| 6,212,308 B1 | | 4/2001 | Donald ........................ 385/16 |
| 6,225,133 B1 | | 5/2001 | Yamamichi et al. ........... 438/3 |
| 6,278,541 B1 | | 8/2001 | Baker ........................ 359/291 |
| 6,304,450 B1 | | 10/2001 | Dibene, II et al. .......... 361/704 |
| 6,320,994 B1 | | 11/2001 | Donald et al. ................ 385/16 |
| 6,323,447 B1 | | 11/2001 | Kondoh et al. | |
| 6,351,579 B1 | | 2/2002 | Early et al. ................... 385/18 |
| 6,356,679 B1 | | 3/2002 | Kapany ....................... 385/18 |
| 6,373,356 B1 | | 4/2002 | Gutierrez et al. | |
| 6,396,012 B1 | | 5/2002 | Bloomfield ................. 200/233 |
| 6,396,371 B2 | | 5/2002 | Streeter et al. ................ 335/78 |
| 6,408,112 B1 | | 6/2002 | Bartels ........................ 385/16 |
| 6,446,317 B1 | | 9/2002 | Figueroa et al. ........... 29/25.42 |
| 6,453,086 B1 | | 9/2002 | Tarazona ..................... 385/20 |
| 6,470,106 B2 | | 10/2002 | McClelland et al. .......... 385/16 |
| 6,487,333 B2 | | 11/2002 | Fouquet et al. ............... 385/18 |
| 6,501,354 B1 | | 12/2002 | Gutierrez et al. ............. 335/47 |
| 6,512,322 B1 | | 1/2003 | Fong et al. | |
| 6,515,404 B1 | | 2/2003 | Wong | |
| 6,516,504 B2 | | 2/2003 | Schaper ..................... 29/25.42 |
| 6,559,420 B1 | | 5/2003 | Zarev ......................... 219/209 |
| 6,633,213 B1 | | 10/2003 | Dove .......................... 335/78 |
| 6,798,937 B1 | * | 9/2004 | Wong .......................... 385/16 |
| 6,803,842 B1 | * | 10/2004 | Wong et al. .................. 335/47 |
| 2002/0037128 A1 | | 3/2002 | Burger et al. ................. 385/16 |
| 2002/0146197 A1 | | 10/2002 | Yong ........................... 385/17 |
| 2002/0150323 A1 | | 10/2002 | Nishida et al. ............... 385/16 |
| 2002/0168133 A1 | | 11/2002 | Saito ........................... 385/16 |
| 2003/0035611 A1 | | 2/2003 | Shi ............................. 385/16 |
| 2004/0202408 A1 | * | 10/2004 | Wong .......................... 385/18 |
| 2004/0202410 A1 | * | 10/2004 | Wong et al. .................. 385/19 |

FOREIGN PATENT DOCUMENTS

| | | |
|---|---|---|
| JP | 63-294317 | 12/1988 |
| JP | 8-125487 | 5/1996 |
| JP | 9161640 | 6/1997 |
| WO | WO99/46624 | 12/1999 |

OTHER PUBLICATIONS

Marvin Glenn Wong, "A Piezoelectrically Actuated Liquid Metal Switch", May 2, 2002, patent application (pending, 12 pages of specification, 5 pages of claims, 1 page of abstract, and 10 sheets of drawings (Figs. 1–10).

* cited by examiner

LONGITUDINAL MODE OPTICAL LATCHING RELAY

CROSS REFERENCE TO RELATED APPLICATIONS

This application is related to the following co-pending U.S. patent applications, being identified by the below enumerated identifiers and arranged in alphanumerical order, which have the same ownership as the present application and to that extent are related to the present application and which are hereby incorporated by reference:

Application No. 10010448-1, titled "Piezoelectrically Actuated Liquid Metal Switch", filed May 2, 2002 and identified by Ser. No. 10/137,691;

Application 10010529-1, "Bending Mode Latching Relay", and having the same filing date as the present application;

Application 10010531-1, "High Frequency Bending Mode Latching Relay", and having the same filing date as the present application;

Application 10010570-1, titled "Piezoelectrically Actuated Liquid Metal Switch", filed May 2, 2002 and identified by Ser. No. 10/142,076;

Application 10010571-1, "High-frequency, Liquid Metal, Latching Relay with Face Contact", and having the same filing date as the present application;

Application 10010572-1, "Liquid Metal, Latching Relay with Face Contact", and having the same filing date as the present application;

Application 10010573-1, "Insertion Type Liquid Metal Latching Relay", and having the same filing date as the present application;

Application 10010617-1, "High-frequency, Liquid Metal, Latching Relay Array", and having the same filing date as the present application;

Application 10010618-1, "Insertion Type Liquid Metal Latching Relay Array", and having the same filing date as the present application;

Application 10010634-1, "Liquid Metal Optical Relay", and having the same filing date as the present application;

Application 10010640-1, titled "A Longitudinal Piezoelectric Optical Latching Relay", filed Oct. 31, 2001 and identified by Ser. No. 09/999,590;

Application 10010643-1, "Shear Mode Liquid Metal Switch", and having the same filing date as the present application;

Application 10010644-1, "Bending Mode Liquid Metal Switch", and having the same filing date as the present application;

Application 10010656-1, titled "A Longitudinal Mode Optical Latching Relay", and having the same filing date as the present application;

Application 10010663-1, "Method and Structure for a Pusher-Mode Piezoelectrically Actuated Liquid Metal Switch", and having the same filing date as the present application;

Application 10010664-1, "Method and Structure for a Pusher-Mode Piezoelectrically Actuated Liquid Metal Optical Switch", and having the same filing date as the present application;

Application 10010790-1, titled "Switch and Production Thereof", filed Dec. 12, 2002 and identified by Ser. No. 10/317,597;

Application 10011055-1, "High Frequency Latching Relay with Bending Switch Bar", and having the same filing date as the present application;

Application 10011056-1, "Latching Relay with Switch Bar", and having the same filing date as the present application;

Application 10011064-1, "High Frequency Push-mode Latching Relay", and having the same filing date as the present application;

Application 10011065-1, "Push-mode Latching Relay", and having the same filing date as the present application;

Application 10011121-1, "Closed Loop Piezoelectric Pump", and having the same filing date as the present application;

Application 10011329-1, titled "Solid Slug Longitudinal Piezoelectric Latching Relay", filed May 2, 2002 and identified by Ser. No. 10/137,692;

Application 10011344-1, "Method and Structure for a Slug Pusher-Mode Piezoelectrically Actuated Liquid Metal Switch", and having the same filing date as the present application;

Application 10011345-1, "Method and Structure for a Slug Assisted Longitudinal Piezoelectrically Actuated Liquid Metal Optical Switch", and having the same filing date as the present application;

Application 10011397-1, "Method and Structure for a Slug Assisted Pusher-Mode Piezoelectrically Actuated Liquid Metal Optical Switch", and having the same filing date as the present application;

Application 10011398-1, "Polymeric Liquid Metal Switch", and having the same filing date as the present application;

Application 10011410-1, "Polymeric Liquid Metal Optical Switch", and having the same filing date as the present application;

Application 10011436-1, "Longitudinal Electromagnetic Latching Optical Relay", and having the same filing date as the present application;

Application 10011437-1, "Longitudinal Electromagnetic Latching Relay", and having the same filing date as the present application;

Application 10011458-1, "Damped Longitudinal Mode Optical Latching Relay", and having the same filing date as the present application;

Application 10011459-1, "Damped Longitudinal Mode Latching Relay", and having the same filing date as the present application;

Application 10020013-1, titled "Switch and Method for Producing the Same", filed Dec. 12, 2002 and identified by Ser. No. 10/317,963;

Application 10020027-1, titled "Piezoelectric Optical Relay", filed Mar. 28, 2002 and identified by Ser. No. 10/109,309;

Application 10020071-1, titled "Electrically Isolated Liquid Metal Micro-Switches for Integrally Shielded Microcircuits", filed Oct. 8, 2002 and identified by Ser. No. 10/266,872;

Application 10020073-1, titled "Piezoelectric Optical Demultiplexing Switch", filed Apr. 10, 2002 and identified by Ser. No. 10/119,503;

Application 10020162-1, titled "Volume Adjustment Apparatus and Method for Use", filed Dec. 12, 2002 and identified by Ser. No. 10/317,293;

Application 10020241-1, "Method and Apparatus for Maintaining a Liquid Metal Switch in a Ready-to-Switch Condition", and having the same filing date as the present application;

Application 10020242-1, titled "A Longitudinal Mode Solid Slug Optical Latching Relay", and having the same filing date as the present application;

Application 10020473-1, titled "Reflecting Wedge Optical Wavelength Multiplexer/Demultiplexer", and having the same filing date as the present application;

Application 10020540-1, "Method and Structure for a Solid Slug Caterpillar Piezoelectric Relay", and having the same filing date as the present application;

Application 10020541-1, titled "Method and Structure for a Solid Slug Caterpillar Piezoelectric Optical Relay", and having the same filing date as the present application;

Application 10030438-1, "Inserting-finger Liquid Metal Relay", and having the same filing date as the present application;

Application 10030440-1, "Wetting Finger Liquid Metal Latching Relay", and having the same filing date as the present application;

Application 10030521-1, "Pressure Actuated Optical Latching Relay", and having the same filing date as the present application;

Application 10030522-1, "Pressure Actuated Solid Slug Optical Latching Relay", and having the same filing date as the present application; and Application 10030546-1, "Method and Structure for a Slug Caterpillar Piezoelectric Reflective Optical Relay", and having the same filing date as the present application.

FIELD OF THE INVENTION

The invention relates to the field of optical switching relays, and in particular to a piezoelectrically activated optical relay array that latches by means of a liquid metal.

BACKGROUND OF THE INVENTION

Communications systems using optical signals require the use of optical switches and routers. An early approach to optical switching was to convert the optical signal to an electrical signal, use an electrical switch or router and then convert back to an optical signal. More recently, optical relays have been used in which an electrical control signal is used to control the switching or routing of an optical signal. Optical relays typically switch optical signals by using movable solid mirrors or by using the creation of bubbles in liquid. The moveable mirrors may use electrostatic latching mechanisms, whereas bubble switches do not latch. Piezoelectric latching relays either use residual charges in the piezoelectric material to latch, or actuate switch contacts containing a latching mechanism.

SUMMARY

This invention relates to an optical relay array that uses a liquid metal, such as mercury, as a switching mechanism and as a latching mechanism. In particular, the present invention relates to a piezoelectric optical relay array having one or more array elements. An array element contains a transparent mirror housing, located at the intersection of two optical paths. A liquid metal slug is moved within a channel passing through the transparent mirror housing by the action of piezoelectric elements. The surface of the liquid metal slug forms a reflective surface. The liquid metal slug is moved in or out of the transparent mirror housing to select between the optical paths. When the liquid metal slug is within the transparent mirror housing, an incoming optical signal is reflected from the reflective surface of the liquid metal, otherwise the optical signal passes through the transparent housing. Wettable metal surfaces within the channel provide a latching mechanism.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DESCRIPTION OF THE INVENTION

Figure 1:
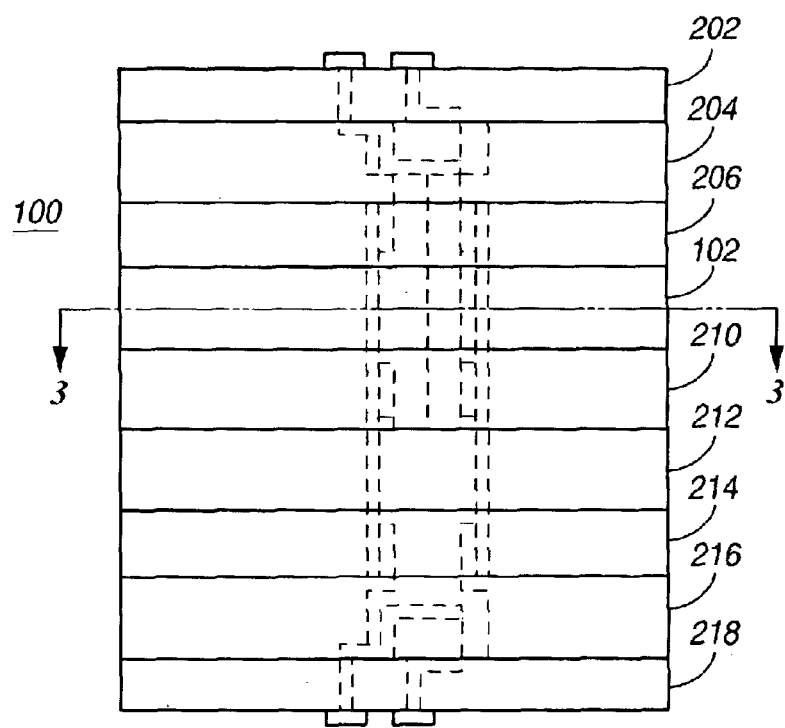
FIG. 1 is a side view of an optical relay consistent with a certain embodiment of the present invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

The present invention relates to an optical relay that latches by means of a liquid metal, such as mercury. When a small volume of liquid metal wets a surface, the surface tension of liquid metal tends to hold the liquid metal to the surface. In an optical relay of the present invention, a liquid metal slug is used to block or unblock an optical path. Surface tension is used as a latching mechanism to maintain the position of the liquid metal slug.

Piezoelectric materials and magnetorestrictive materials (collectively referred to as "piezoelectric" materials below) deform when an electric or magnetic field is applied.

The relay operates by means of the longitudinal deformation of a piezoelectric element, in extension mode, displacing a liquid metal slug causing it to wet between at least one contact pad on the piezoelectric element or substrate and at least one other fixed pad to block the optical path. The same motion that causes the liquid metal slug to change position can cause the optical path to be unblocked between the fixed pad and a contact pad on the piezoelectric element or substrate close to it. This motion of the piezoelectric element is rapid and causes the imparted momentum of the liquid metal slug to overcome the surface tension forces that would hold it in contact with the contact pad or pads near the actuating piezoelectric element. The switch latches by means of surface tension and the liquid metal wetting to the contact pads. The liquid metal slug can wet to wettable metal elements in the optical path cavity, thereby creating a mirror effect that can be used to redirect the optical signal in a different direction.

In one embodiment, the switch is made using micro-machining techniques for small size. In this embodiment the switching time is short (for comparison, piezoelectrically driven thermal inkjet print-heads have firing frequencies of several kHz and the fluid dynamics in the present invention is much simpler than in an inkjet print head). Little heat is generated since the only heat generators are the piezoelectric element and the passage of control and electric currents through the conductors of the switch. The micro-machined optical relay of the present invention is made up of a number of layers.

Figure 2:
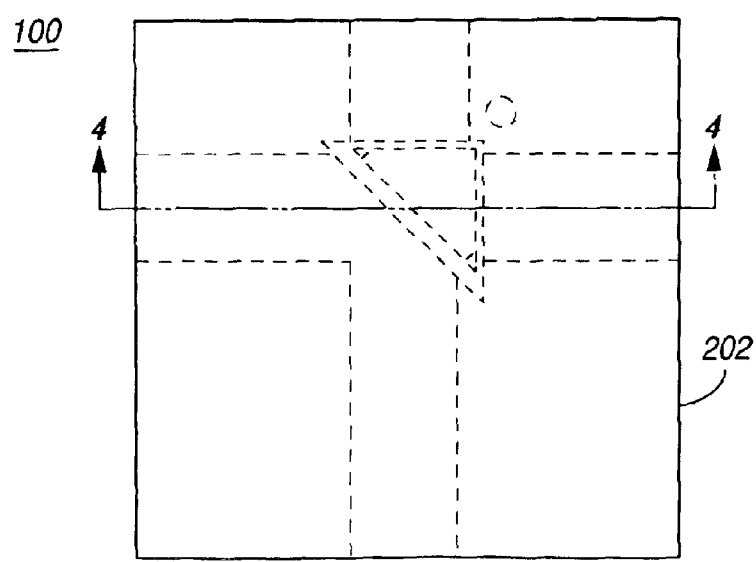
FIG. 2 is a top view of an optical relay consistent with a certain embodiment of the present invention.

FIG. 1 is a side view of an optical relay 100 of one embodiment of the present invention. Referring to FIG. 1, the relay contains a top circuit layer 202, a top piezoelectric layer 204, upper seal belt layer 206, upper optical layer 102, middle seal belt layer 210, lower optical layer 212, lower seal belt layer 214, lower piezoelectric layer 216 and lower circuit layer 218. The section 3—3 is discussed below with reference to FIG. 3. FIG. 2 is a top view of the optical relay 100. The section 4—4 is discussed below with reference to FIG. 4.

Figure 3:
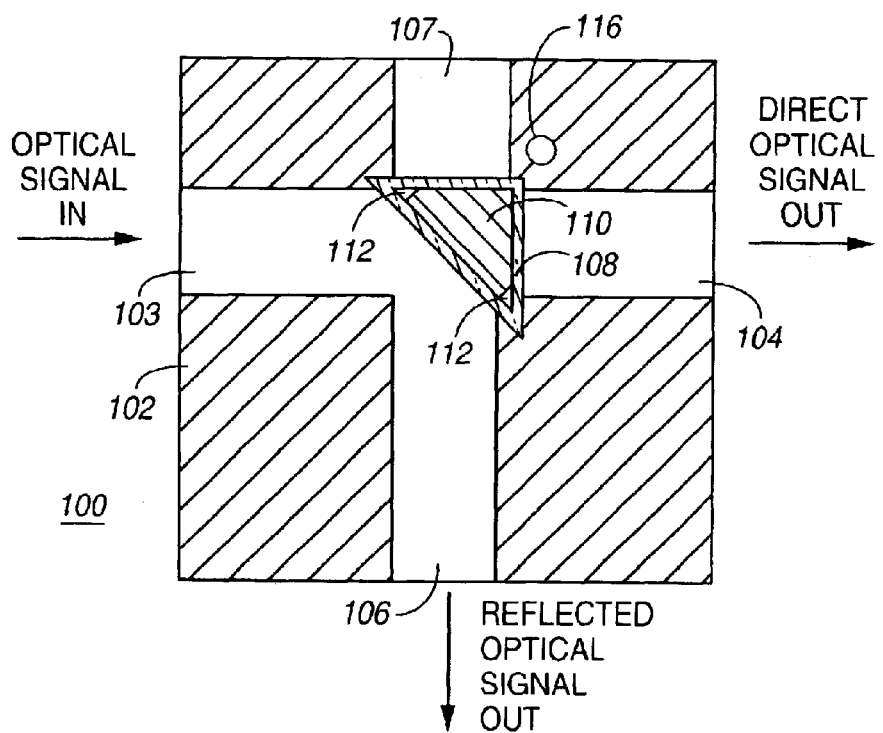
FIG. 3 is a sectional view of an optical layer of an optical relay consistent with a certain embodiment of the present invention.

FIG. 3 is a sectional view through the section 3—3 of the optical layer of an optical relay 100 of one embodiment of the present invention. Referring to FIG. 3, the layer 102 contains a first input optical path or waveguide 103 and a first output optical path or waveguide 104. These paths are optically aligned to form a direct optical path through the layer. A second optical output path or waveguide 106 intersects the direct optical path. In operation, an optical signal enters path 103 (from the left in the figure) and either passes directly through the relay via path 104 or is deflected to exit the relay through path 106. A transparent, hollow tube 108 is located at the intersection of the paths 104 and 106. The transparent, hollow tube 108 is also referred to as a transparent mirror housing in the sequel. The axis of tube is substantially perpendicular to the layer 102. Tubes having other than triangular cross-sectional shapes may be used, however, one face of the tube should be planar and angled so that the normal to the face bisects the angle between the path 104 and the path 106. In FIG. 3, the paths are at right angles, so the face is angled at 45°. Other angles may be used without departing from the present invention. A liquid metal slug 110 is positioned in a channel that passes through the transparent tube 108, and is free to slide axially along the channel. Surface tension in the liquid metal tends to retain the liquid metal in a single volume. Where the transparent tube passes through the optical layer, the corners of the transparent tube are filled with a wettable metal 112. The liquid metal is drawn across the face of the transparent tube by the surface tension attracting the liquid metal to the wettable metal in the corners of the tube. As a result, the surface of the liquid metal is planar and highly reflective. An optical signal entering the channel 103 is reflected from the surface of the liquid metal 108 and exits the relay through channel 106. When the liquid metal slug 110 is moved out of the path of the optical signal, the optical signal passes through the transparent tube and exits the relay through channel 104. In operation, the liquid metal slug 110 moves axially along the channel through the transparent tube. Displaced gas within the channel is allowed to flow from one end of the channel to the other via a vent 116. Optionally, a second optical input path 107 may be incorporated, to facilitate coupling of optical relays in an array.

Figure 4:
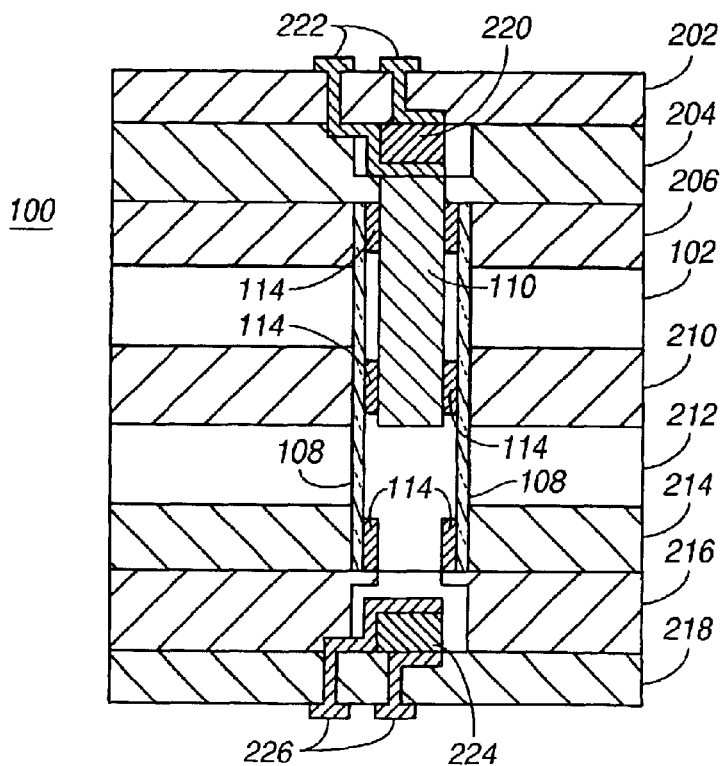
FIG. 4 is a sectional view of an optical relay consistent with a certain embodiment of the present invention.

FIG. 4 shows a sectional view along the section 4—4 in FIG. 2. The optical relay 100 is made up of a number of layers that may be formed by micro-machining. An upper circuit layer 202 contains conductive vias and electrical interconnect pads 222. A spacer layer 204 includes a piezoelectric element 220. The piezoelectric element 220 is configured to move in an extensional mode parallel to the axis of the transparent tube (mirror housing) 108. Electrical drive signals are supplied to the piezoelectric element 220 through the conducting vias and interconnect pads 222. An upper seal belt layer 206 holds the upper end of the transparent tube 108. In this layer, the transparent tube is lined with a wettable metal 114. Preferably, the wettable metal covers all interior faces of the transparent tube to form a seal belt or contact. In an alternative embodiment, the transparent tube does not extend into the seal belt layer, and the wettable metal is applied to the substrate of the layer. In a still further embodiment, the wettable metal is applied to the surface of the piezoelectric element. When the liquid metal slug is at the top of the transparent tube, as shown in FIG. 4, the liquid metal 110 fills the space between the seal belts in the upper seal belt layer 206 and the lower upper seal belt layer 210. Surface tension then holds the liquid metal slug in place, preventing it from moving within the channel passing through the transparent tube. The combination of wettable surfaces and liquid metal provides a latching mechanism for the relay. The vent (116 in FIG. 3) opens into the seal belt layer 206. The first optical layer 102 contains an optical path, through which the transparent tube 108 passes. A middle seal belt layer 210 holds the middle of the transparent tube 108. In this layer, the transparent tube is again lined with a wettable metal seal belt 114, to provide an additional latching mechanism. The spacer layer 212 may, optionally, contain additional optical paths. The lower seal belt layer 214 functions in the same way as the upper seal belt layer. The lower seal belt layer provides additional latching via lower seal belts 114 when the liquid metal slug 110 is moved to the lower end of the transparent tube 108. The lower spacer layer 216 and the lower circuit layer 218 function the same as the corresponding upper layers, 204 and 202 respectively.

Figure 5:
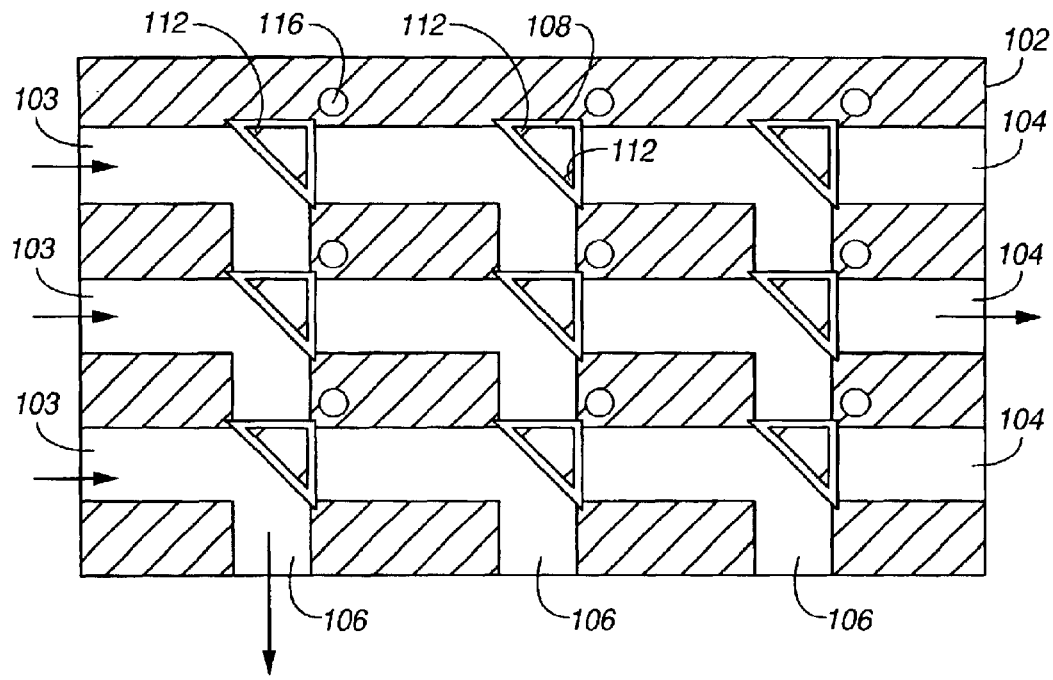
FIG. 5 is a sectional view of an optical layer of an optical relay array consistent with a certain embodiment of the present invention.

FIG. 5 shows a section through the optical layer of an optical relay array comprising a rectangular grid of optical relay elements. The embodiment shown in FIG. 5 has nine elements, but other size arrays may be used. The optical relay array has three input optical paths 103 and three first output optical paths 104, which together form three direct optical paths through the layer. In addition, three second output optical paths 106 are provided, intersecting the three direct optical paths. A transparent mirror housing 108 is located at each of the nine intersections. In one embodiment, the housing has a triangular cross-section. A wettable metal 112 fills the two corners of the transparent mirror housing 108 on either side of the planar face of the mirror housing. Close to each mirror housing is a pressure relief vent 116, passing through the optical layer 102. An input optical signal, entering the relay at one of the input optical paths 103, may be routed to one of the second output optical paths 106 by positioning a liquid metal slug at the intersection of the input optical path and the output optical path. The reflective surface of the wetted slug deflects the optical signal along a second output optical path. Alternatively, if no liquid metal slug is present, the input optical signal passes through the transparent mirror housing 108 and exits the relay from the corresponding first output optical path 104.

Figure 6:
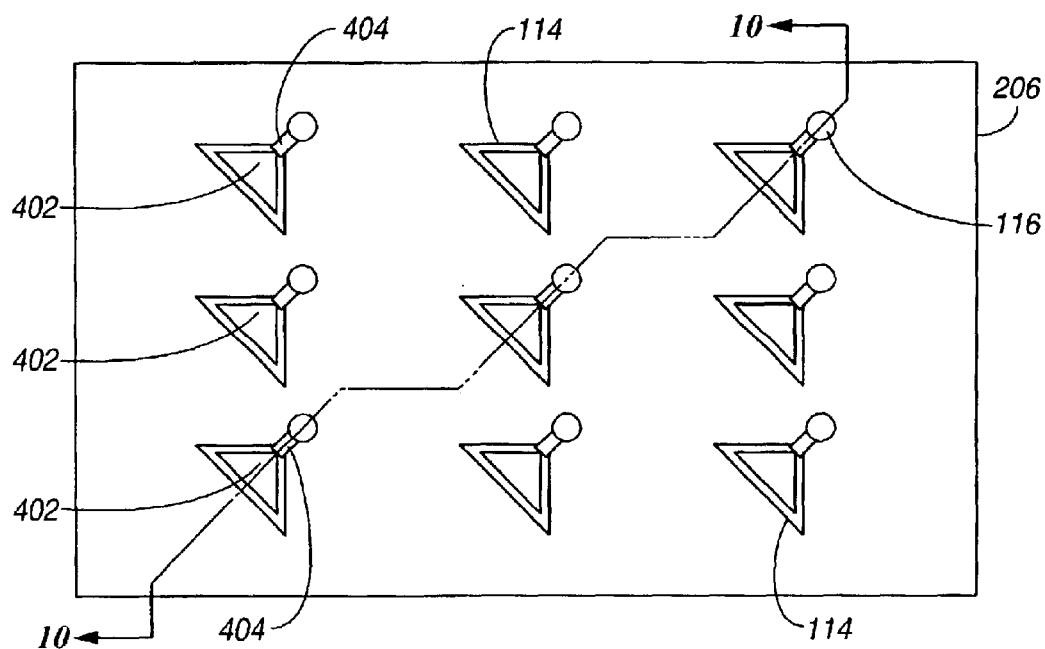
FIG. 6 is a top view of a seal belt layer of an optical relay array consistent with a certain embodiment of the present invention.

FIG. 6 is a diagrammatic representation of an embodiment of an upper seal belt layer 206 of an optical relay array. The layer contains an array of nine triangular holes 402 through which liquid metal slugs may pass. Each hole is lined with a wettable metal seal belt or contact 114. Optionally, the transparent mirror housing may pass through the seal belt layer, as shown in FIG. 4, in which case the wettable metal lines the inside of the transparent mirror housing. Referring again to FIG. 6, each hole 402 is coupled by a channel 404 to the pressure relief vent 116. The channel 404 allows gas to flow between the hole and the vent. Middle seal belt layer 210 has a similar construction, but does not include channels 404. Lower seal belt layer 214 is also of a similar construction, except that the channels are on the lower surface of the layer. The section 10—10 is discussed below with reference to FIG. 10.

Figure 7:
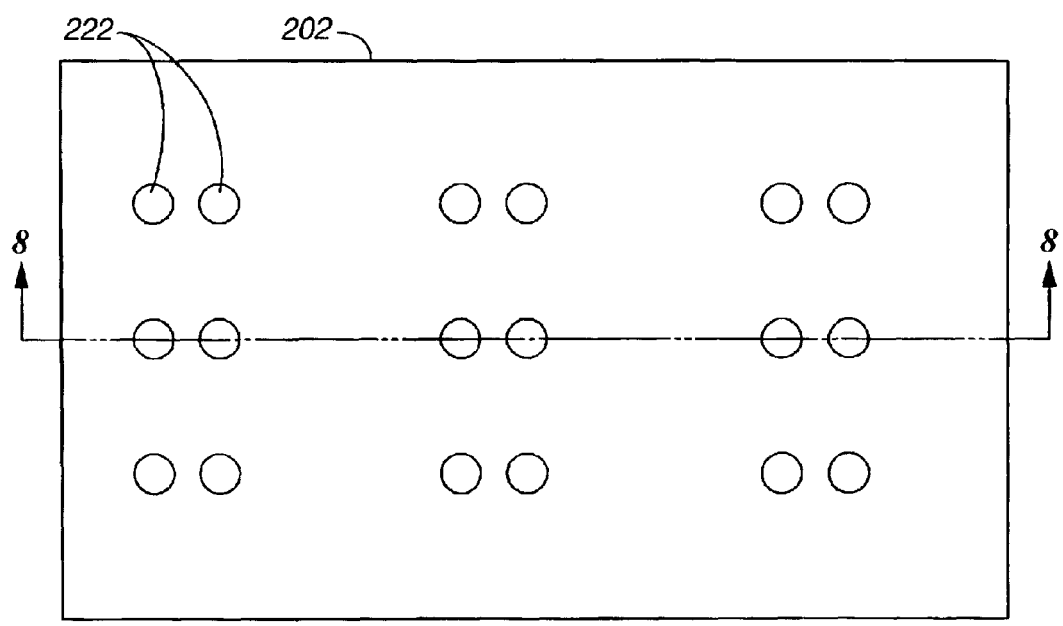
FIG. 7 is a view of an upper circuit layer of an optical relay array consistent with a certain embodiment of the present invention.
Figure 8:
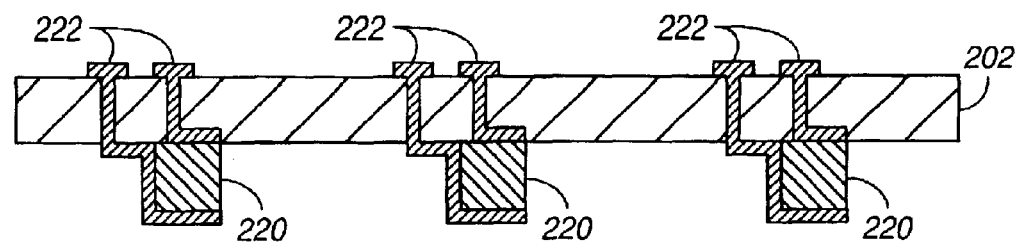
FIG. 8 is a sectional view of an upper circuit layer of an optical relay array consistent with a certain embodiment of the present invention.

FIG. 7 is a view of the upper circuit layer of an optical relay array. Interconnection pads of electrical conductors 222 are located on top of the layer to facilitate connection of the relay to the electrical signals that control the piezoelectric elements of the array. A sectional view through section 8—8 in FIG. 7 is shown in FIG. 8. This shows how the conductors pass through vias in the circuit layer and couple to the piezoelectric elements 220. The electrical conductors couple to the top and bottom surfaces of the piezoelectric element and operate to supply an electric potential across the piezoelectric element. The lower circuit layer 218 has a similar construction.

Figure 9:
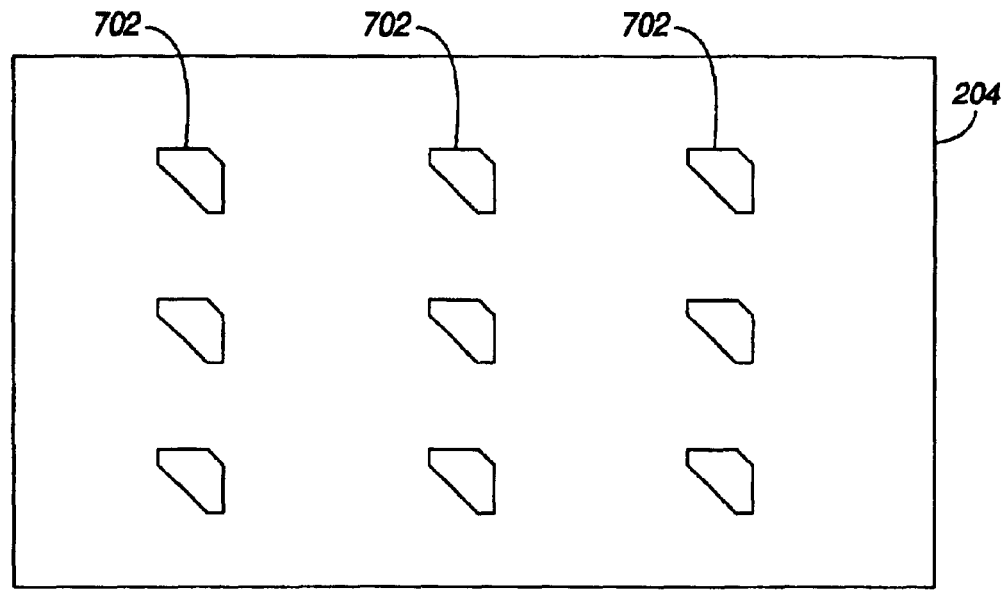
FIG. 9 is a view of a spacer layer of an optical relay array consistent with a certain embodiment of the present invention.

An embodiment of a spacer layer of the optical relay array is shown in FIG. 9. The spacer layer contains an array of holes 702 through which liquid metal slugs may pass. These holes align with the corresponding holes in the other layers to form channels. The channel enables the liquid metal slugs to pass through the layers to block or unblock the direct optical paths.

Figure 10:
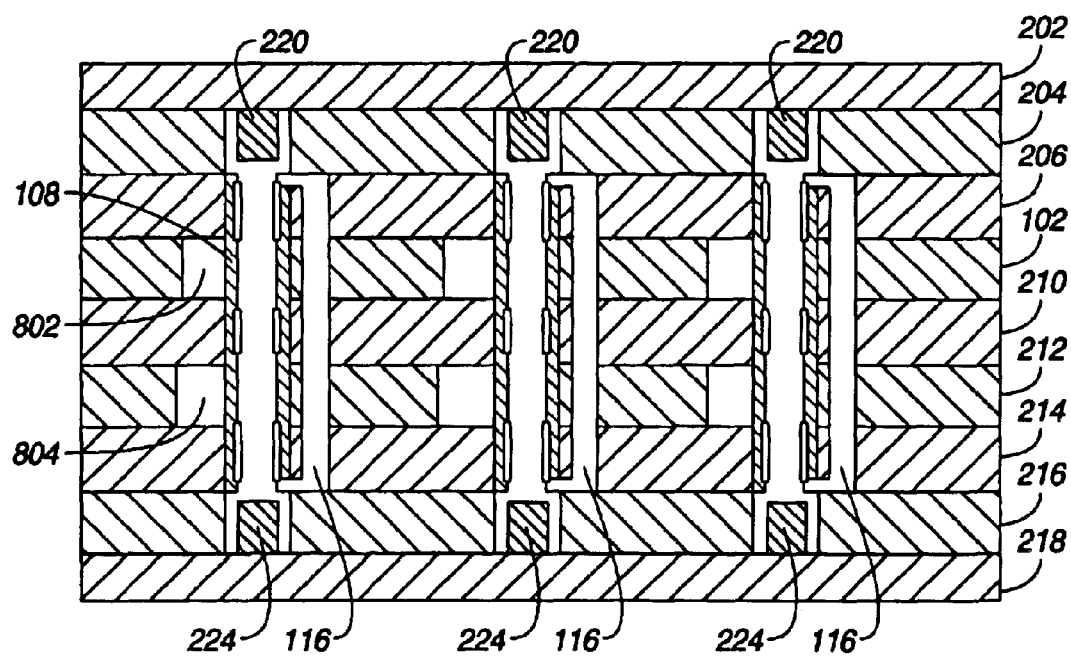
FIG. 10 is a further sectional view of an optical relay consistent with a certain embodiment of the present invention.

A diagonal cross-section through an optical relay array is shown in FIG. 10. The cross section, shown as section 10—10 in FIG. 6, is taken vertically through the pressure relief vents 116 and shows how the pressure relief vents open to the interior of the transparent mirror housing 108. Opening 802 in the optical layer 102, and other corresponding openings in the layer, are at the intersection of the input optical paths and the output optical paths. Opening 804 is at a corresponding intersection in the optional lower optical path in spacer layer 212. For clarity, neither the liquid metal slugs nor the electrical conductors are shown in FIG. 10. The pressure relief vents 116 allow gas to pass from one end of the hollow tube 108 to the other end as the liquid metal slug moves within the tube. The pressure relief vents 116 also serve to dampen the motion of the liquid metal slug as gas is forced through the vent.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A piezoelectric optical relay array of one or more array elements, wherein an array element of the one or more array elements comprises:
   a first input optical path;
   a first output optical path, optically aligned with the first input optical path to form a direct optical path;
   a second output optical path intersecting the first input optical path;
   a transparent mirror housing, located at the intersection of the first input optical path and the second output optical path;
   a liquid metal slug adapted to move within a channel passing through the transparent mirror housing, the liquid metal slug having a reflective surface;
   a first piezoelectric actuator operable to move the liquid metal slug within the channel so that it blocks the direct optical path and completes a reflected optical path from the first input optical path to the second output optical path; and
   a second piezoelectric actuator operable to move the liquid metal slug within the channel to remove it from the direct optical path.

2. A piezoelectric optical relay array in accordance with claim 1, wherein the array element further comprises a metal coating applied to a portion of the interior of the transparent mirror housing, the metal coating being wettable by liquid metal.

3. A piezoelectric optical relay array in accordance with claim 2, wherein the transparent mirror housing is a triangular tube and the metal coating is applied to the corners of the transparent mirror housing, the metal coating tending to cause the liquid metal slug to form a reflective surface.

4. A piezoelectric optical relay array in accordance with claim 2, wherein the metal coating is applied to the interior of the channel above and below the direct and reflected optical paths and is wettable by the liquid metal slug.

5. A piezoelectric optical relay array in accordance with claim 1, wherein the first piezoelectric element is operable to move the liquid metal slug in a first direction by supplying an impulsive force to a first end of the liquid metal slug and wherein the second piezoelectric element is operable to move the liquid metal slug in a second direction by supplying an impulsive force to a second end of the liquid metal slug.

6. A piezoelectric optical relay array in accordance with claim 1, wherein the array element further comprises a vent opening to and connecting the ends of the channel, the vent adapted to relieve pressure in the channel when the liquid metal slug is moved.

7. A piezoelectric optical relay array in accordance with claim 6, wherein the vent is sized and positioned to dampen the motion to liquid metal slug.

8. A piezoelectric optical relay array in accordance with claim 1, wherein the array element further comprises a second input optical path, optically aligned with the second output optical path.

9. A piezoelectric optical relay array in accordance with claim 8, wherein the array comprises a plurality of array elements arranged in a rectangular grid.

10. A piezoelectric optical relay array in accordance with claim 1, wherein the transparent mirror housing extends substantially the whole length of the channel.

11. A piezoelectric optical relay array in accordance with claim 10, wherein the transparent mirror housing is coated with a wettable metal above and below the direct and reflected optical paths.

12. A piezoelectric optical latching relay array comprising:
   a plurality of input optical paths;
   a plurality of first output optical paths, optically aligned with the plurality of input optical paths to form a plurality of direct optical paths;
   a plurality of second output optical paths intersecting the plurality of input optical paths at a plurality of intersections; and
   at each of intersection of the plurality of intersections:
      a transparent mirror housing;
      a liquid metal slug moveably located within a channel passing through the transparent mirror housing, the liquid metal slug having a reflective surface;
      a first piezoelectric actuator operable to move the liquid metal slug within the channel so that it blocks a direct optical path of the plurality of direct optical path and completes a reflected optical path from an input optical path of the plurality of input optical paths to a second output optical path of the plurality of second output optical paths; and
      a second piezoelectric actuator operable to move the liquid metal slug within the channel to remove the liquid metal slug from a direct optical path of the plurality of direct optical paths.

13. A micro-machined piezoelectric optical relay array comprising:
   an upper spacer layer containing a first piezoelectric element;
   a first pair of electrical connectors electrically coupled to the first piezoelectric element;
   an upper optical path layer containing a first direct optical path and a first reflected optical path, the first direct optical path and the first reflected optical path having an intersection;
   a middle spacer layer;
   a lower spacer layer containing a second piezoelectric element;
   a second pair of electrical connectors electrically coupled to the second piezoelectric element;
   a transparent mirror housing located at the intersection of the first direct optical path and the first reflected optical path; and
   a liquid metal slug moveably positioned within a channel passing through the transparent mirror housing;
   wherein, the first piezoelectric element is operable to move the liquid metal slug to a first position removed from the first direct optical path and the second piezoelectric element is operable to move the liquid metal slug to a second position, within the direct optical path, where it completes the first reflected optical path by reflecting light from a surface of the liquid metal slug.

14. A micro-machined piezoelectric optical relay array in accordance with claim 13, further comprising:
   an upper seal belt layer between the upper spacer layer and the upper optical path layer and containing an upper wettable metal contact;
   an middle seal belt layer between the upper optical path layer and the middle spacer layer and containing a middle wettable metal contact; and
   a lower seal belt layer between the middle spacer layer and the lower spacer layer and containing an lower wettable metal contact;
   wherein, in the first position, the liquid metal slug is in wetted contact with the wettable metal contacts in the upper and middle seal belt layers and, in the second position, the liquid metal slug is in wetted contact with the wettable metal contacts in the middle and lower seal belt layers.

15. A micro-machined piezoelectric optical relay array in accordance with claim 14, wherein the channel passes the upper, middle and lower seal belt layers and further comprising a pressure relief vent opening to the channel in the upper seal belt layer and the lower seal belt layer.

16. A micro-machined piezoelectric optical relay array in accordance with claim 14, wherein the hollow transparent housing passes through the upper, middle and lower seal belt layers and further comprising a pressure relief vent opening to the hollow transparent housing in the upper seal bet layer and the lower seal belt layer.

17. A micro-machined piezoelectric optical relay array in accordance with claim 13, wherein the middle spacer layer contains a second direct optical path and a second reflected optical path.

18. A micro-machined piezoelectric optical relay array in accordance with claim 13, wherein the upper optical path layer contains a plurality of first direct optical paths and a plurality of first reflected optical paths.

19. A micro-machined piezoelectric optical relay array in accordance with claim 13, further comprising:
   an upper circuit layer positioned on top of the upper spacer layer;
   a lower circuit layer positioned below the lower spacer layer,
   wherein the first pair of electrical connectors passes through the upper circuit layer and terminates in a first pair of interconnection pads and the second pair of electrical connectors passes through the lower circuit layer and terminates in a second pair of interconnection pads.

20. A method for selecting between a direct optical path and a reflected optical path in a piezoelectric optical relay having a liquid metal slug moveable by a first piezoelectric element and a second piezoelectric element, the method comprising:
   coupling an input optical signal to an input optical waveguide of the piezoelectric optical relay, the input optical waveguide being optically aligned with a first output optical waveguide to form the direct optical path;
   if the direct optical path is to be selected:
      applying an electrical impulse to the first piezoelectric element to move the liquid metal slug out of the direct optical path, whereby the input optical waveguide is optically coupled to first output optical waveguide; and
   if the reflected optical path is to be selected:
      applying an electrical impulse to the second piezoelectric element to move the liquid metal slug into the direct optical path, whereby the input optical signal is reflected from a surface of the liquid metal slug into a second output optical waveguide to complete the reflected optical path.

* * * * *